United States Patent
Nakamura (10) Patent No.: US 11,152,029 B2
(45) Date of Patent: Oct. 19, 2021

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventor: Daigo Nakamura, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/016,841

(22) Filed: Sep. 10, 2020

(65) Prior Publication Data

US 2021/0280216 A1    Sep. 9, 2021

(30) Foreign Application Priority Data

Mar. 9, 2020  (JP) .............................. JP2020-039794

(51) Int. Cl.
*G11B 5/55* (2006.01)
*G11B 20/12* (2006.01)
*G11B 5/596* (2006.01)

(52) U.S. Cl.
CPC .......... *G11B 20/1258* (2013.01); *G11B 5/596* (2013.01); *G11B 2020/1281* (2013.01)

(58) Field of Classification Search
CPC . G11B 5/596; G11B 5/59688; G11B 5/59694; G11B 20/1889; G11B 27/36; G11B 5/54; G11B 5/012; G11B 20/12; G11B 5/00; G11B 5/5539; G11B 20/20; G11B 5/58; G11B 5/56
USPC .............................. 360/48, 75, 77.01, 31, 76
See application file for complete search history.

(56) References Cited

U.S. PATENT DOCUMENTS

| | | | |
|---|---|---|---|
| 6,556,371 B1 | 4/2003 | Ottesen et al. | |
| 9,311,939 B1 * | 4/2016 | Malina | G11B 19/042 |
| 2003/0197969 A1 | 10/2003 | Szita et al. | |
| 2012/0019957 A1 | 1/2012 | Szita | |
| 2013/0194695 A1 | 8/2013 | Akiya | |

FOREIGN PATENT DOCUMENTS

| | | |
|---|---|---|
| JP | 2008-132027 A | 6/2008 |
| JP | 2013-157065 A | 8/2013 |

* cited by examiner

*Primary Examiner* — Nabil Z Hindi (57) ABSTRACT

According to one embodiment, a magnetic disk device includes a magnetic disk, a magnetic head, and a controller. The magnetic disk has a plurality of tracks. The magnetic head performs reading and writing from and to the magnetic disk. The controller controls write operations to a first region and a second region of the magnetic disk in different manners. The second region is narrower in track pitch than the first region.

18 Claims, 9 Drawing Sheets

MAGNETIC DISK DEVICE AND METHOD

CROSS-REFERENCE TO RELATED APPLICATIONS

This application is based upon and claims the benefit of priority from Japanese Patent Application No. 2020-039794, filed on Mar. 9, 2020; the entire contents of which are incorporated herein by reference.

FIELD

Embodiments described herein relate generally to a magnetic disk device and method.

BACKGROUND

Traditionally, magnetic disk devices including a magnetic disk having tracks are known. The center of the tracks may become eccentric to the rotational center of the disk, and two adjacent tracks of such a magnetic disk may differ in direction or ratio of eccentricity. In such a case, the distance, that is, track pitch, between the two adjacent tracks may be partially shorter than the rest. In such a part, there may be an event that data is written first to one of the two tracks and another data is excessively overwritten to the other track. This may cause difficulty in reading the first written data.

DETAILED DESCRIPTION

According to an embodiment, in general, a magnetic disk device includes a magnetic disk, a magnetic head, and a controller. The magnetic disk has a plurality of tracks. The magnetic head performs reading and writing from and to the magnetic disk. The controller controls write operations to a first region and a second region of the magnetic disk in different manners. The second region is narrower in track pitch than the first region.

Hereinafter, embodiments of a magnetic disk device and method will be described in detail with reference to the accompanying drawings. The embodiments are presented for illustrative purpose only and not intended to limit the scope of the present invention.

First Embodiment

Figure 1:
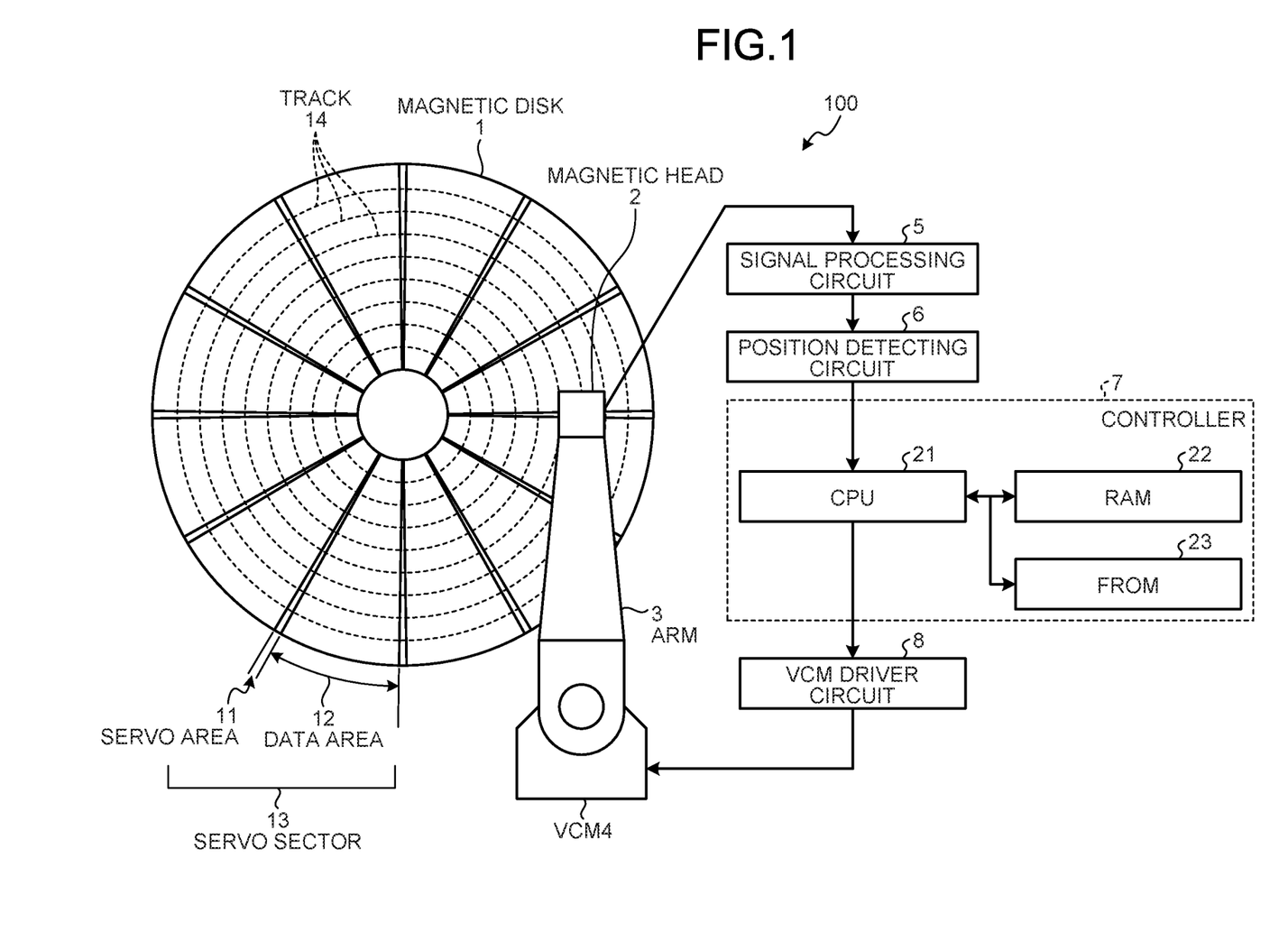
FIG. 1 is a schematic diagram illustrating an exemplary hardware configuration of a magnetic disk device according to a first embodiment.

FIG. 1 is a schematic diagram illustrating an exemplary hardware configuration of a magnetic disk device according to a first embodiment.

The magnetic disk device 100 includes a magnetic disk 1. The magnetic disk device 100 writes and reads data from and to the magnetic disk 1 in response to an access command from a host (not illustrated).

The magnetic disk device 100 includes a magnetic head 2 that writes and reads data. Specifically, the magnetic disk device 100 includes the magnetic head 2, an arm 3, a voice coil motor (VCM) 4, a signal processing circuit 5, a position detecting circuit 6, a controller 7, and a VCM driver circuit 8, in addition to the magnetic disk 1.

The magnetic disk 1 refers to a disk having a magnetic layer formed on the surface. The magnetic disk 1 is rotated by a spindle motor (not illustrated) about a rotational axis at a given rotational speed. The magnetic head 2 is equipped with a write element and a read element that write and read data to and from the rotating magnetic disk 1, respectively. The magnetic head 2 is attached to the distal end of the arm 3. The magnetic head 2 is radially moved on the magnetic disk 1 by the VCM 4, which is driven by the VCM driver circuit 8.

Servo information is written to the surface of the magnetic disk 1 by, for example, a servo writer or self-servo write (SSW). The servo information includes sector/cylinder information, a burst pattern, and a post code, for instance. The sector/cylinder information provides servo addresses along the circumference and the radius of the magnetic disk 1, and can be used in seek control over the magnetic head 2 to be moved to a target track. The burst pattern and the post code can be used in tracking control over the magnetic head 2 to be positioned on the target track.

FIG. 1 illustrates radial arrangement of servo areas 11 to which the servo information is written, as an exemplary servo area arrangement. On the magnetic disk 1, a plurality of tracks 14 is radially set in a concentric form by the servo information. A data area 12 to which data is writable is set between every two servo areas 11 on the circumference of each of the tracks 14. One servo area 11 and one data area 12 following the servo area 11 constitute a servo sector 13. Each data area 12 includes a plurality of continuous data sectors. The magnetic head 2 writes and reads data to and from each data sector.

Known magnetic-disk data writing or recording typically include shingled magnetic recording (SMR) and conventional magnetic recording (CMR).

By SMR, data is written to one track of the magnetic disk, and another data is written to a next track in an overlapping manner, that is, another data is partially written onto the previously written data. This enables track interval, i.e., track pitch to be narrower than the width of the write element, improving recording density.

By CMR, data is written to the magnetic disk such that two pieces of data do not overlap each other on two adjacent tracks. The features of CMR are in higher random access performance.

The first embodiment is applicable to both a magnetic disk device adopting SMR and a magnetic disk device adopting CMR.

The signal processing circuit 5 receives data to be written from the controller 7, and subjects the data to code modulation for supply to the magnetic head 2 via a preamplifier (not illustrated). The signal processing circuit 5 receives, through a preamplifier, signals read from the magnetic disk 1. Among the signals, the signal processing circuit 5 code-demodulates the one corresponding to the data to digital data, and transmits the digital data to the controller 7.

The position detecting circuit 6 detects the position of the magnetic head 2 in accordance with a signal corresponding to the servo information among the signals read from the magnetic disk 1 and received by the signal processing circuit 5 via the preamplifier. The position detecting circuit 6 transmits the detected position of the magnetic head 2 to the controller 7.

The controller 7 sets an input value to the VCM 4 to drive the VCM 4, in accordance with the position of the magnetic head 2 detected at regular intervals, a firmware program, various control parameters, and a program processing time counted by a timer (not illustrated).

The controller 7 transmits and receives data to and from a host located outside the magnetic disk device 100.

The controller 7 includes, for example, a central processing unit (CPU) 21, a random access memory (RAM) 22, and a flash read only memory (FROM) 23. The FROM 23 is a rewritable non-volatile memory, and stores the firmware program and various control parameters. The RAM 22 is a volatile memory and provides an area onto which the firmware program and various control parameters are loaded. Further, the RAM 22 can serve as a buffer or a cache. The controller 7 may include a buffer memory for data transfer between the host and the magnetic disk 1, in addition to the RAM 22.

The firmware program may be stored in the magnetic disk 1. The controller 7 may include hardware circuitry such as a field-programmable gate array (FPGA) and an application specific integrated circuit (ASIC) instead of the CPU 21 or together with the CPU 21.

FIG. 1 illustrates one magnetic disk 1 and one magnetic head 2 by way of example. However, the number of magnetic disks 1 and the number of magnetic heads 2 included in the magnetic disk device 100 are not limited to such an example.

The magnetic disk device 100 may include, for example, a magnetic head 2 opposing the front surface of the magnetic disk 1 and another magnetic head 2 opposing the back surface of the magnetic disk 1.

The magnetic disk device 100 may include a plurality of magnetic disks 1, a magnetic head 2 opposing the front surface of each of the magnetic disks 1, and a magnetic head 2 opposing the back surface thereof.

Further, the magnetic disk device 100 may include two or more pairs of VCMs 4 and arms 3, to move two or more magnetic heads 2 by different pairs of VCMs 4 and arms 3.

The center of the tracks 14 may become eccentric to the rotational center of the magnetic disk 1 due to writing error in servo information. The influence of such eccentricity appears as a periodic variation in radial, target position of the magnetic head 2. This periodic variation in radial, target position is referred to as repeatable runout (RRO). RRO can be corrected by an RRO correction parameter.

Correcting RRO, however, may be not sufficient to position the magnetic head 2 on a target track since the magnetic head 2 may deviate from the target track due to various disturbances. Such disturbances different from the RRO can be referred to as non-repeatable runout (NRRO). In write operation the magnetic head 2 may deviate from the target track because of NRRO, causing a data write interval in the radial direction to be narrower than the interval between the tracks 14.

Irrespective of adoption of SMR or CMR, it is preferable that, to correctly read data, the radial width of the data written area be equal to or larger than a given value, for example, the width of the read element of the magnetic head 2. It is difficult to correctly read data from the data written area of a too narrow radial width. In view of this, to prevent a data write area from decreasing in radial width to or below a given value due to a disturbance such as the NRRO, the data writeable range of the magnetic head 2 in the radial direction (hereinafter, referred to as a writable range) is set on each track. The line defining the boundary between the writable ranges may be referred to as a write offtrack slice (WOS).

For example, when the magnetic head 2 approaches a target writing sector, i.e., target servo sector, the controller 7 determines whether the position of the magnetic head 2 is located within the writable range defined by WOS. When the magnetic head 2 is within the writable range defined by WOS, the controller 7 determines that the magnetic head 2 is located on the target track, and causes the magnetic head 2 to write data. If the magnetic head 2 deviates from the writable range defined by WOS, the controller 7 determines that the magnetic head 2 is not on the target track, and refrains from causing the magnetic head 2 to write data.

After determining that the magnetic head 2 is not on the target track, the controller 7 determines again whether the magnetic head 2 is on the target track when the magnetic head 2 fully rotates and approaches the target sector again, for example. After determining that the magnetic head 2 is on the target track, the controller 7 can cause the magnetic head 2 to perform a write operation. This process is referred to as write retry.

Meanwhile, the tracks 14 may differ in direction or ratio of eccentricity from one another.

Figure 2:
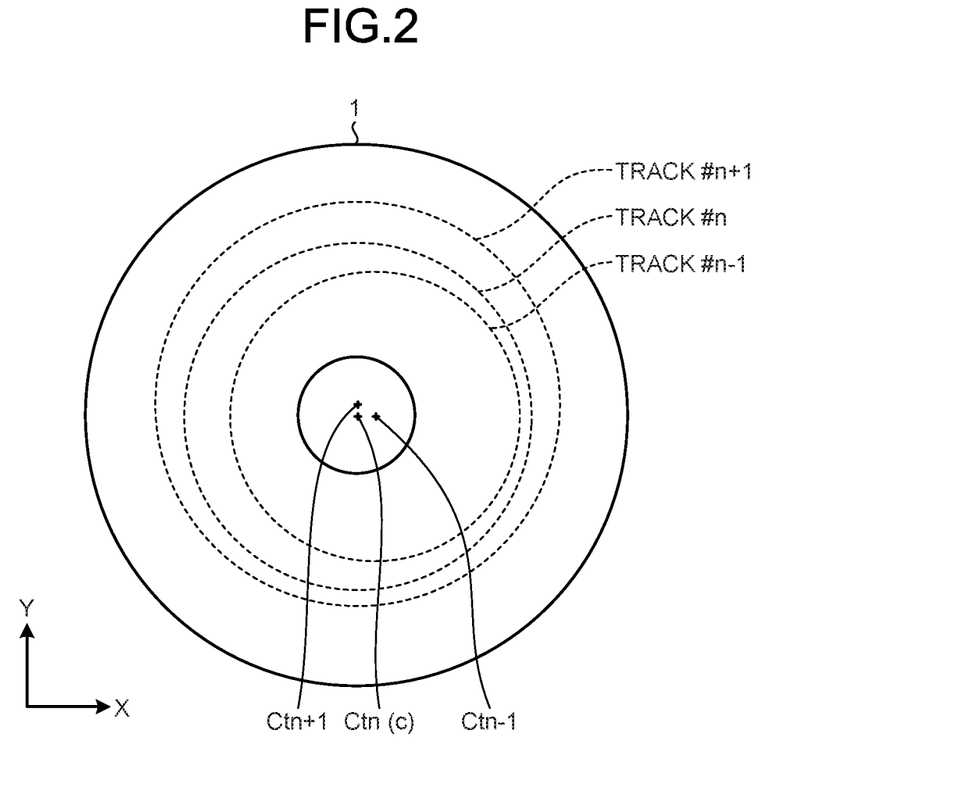
FIG. 2 is a schematic diagram illustrating exemplary tracks set on a magnetic disk according to the first embodiment.

FIG. 2 is a schematic diagram illustrating an example of the tracks 14 set on the magnetic disk 1 of the first embodiment. Herein, the order of eccentricity of the tracks 14 is set to the first order, by way of example. In the case of the tracks 14 having the second or higher order of eccentricity (hereinafter, simply referred to as the order) or the tracks 14 having different orders of eccentricity, the same or like explanation can apply.

In FIG. 2 a coordinate system including an X-axis extending rightward and a Y-axis extending upward is defined for the sake of convenience. The coordinate system is not intended to teach or indicate a specific orientation of the magnetic disk device 100 or the elements thereof, or arrangement or operation of the magnetic disk device 100 or the elements in a specific direction.

FIG. 2 illustrates three tracks 14, i.e., a track #n−1, a track #n, and a track #n+1 as an example of the tracks 14. The track #n−1, the track #n, and the track #n+1 are arranged in this order from the center of the magnetic disk 1 toward the outside. The character n represents an integer of one or more.

A center Ctn of the track #n coincides with a rotational center C of the magnetic disk 1. That is, the track #n is not eccentric. A center Ctn−1 of the track #n−1 is, however, apart from the rotational center C of the magnetic disk 1 in the positive direction of the X-axis. A center Ctn+1 of the track #n+1 is apart from the rotational center C of the magnetic disk 1 in the positive direction of the Y-axis.

The track #n−1 and the track #n+1 are eccentric, so that a track pitch Pn−1 between the track #n−1 and the track #n is not constant circumferentially on the magnetic disk 1. Similarly, a track pitch Pn between the track #n and the track #n+1 is not constant circumferentially on the magnetic disk 1, either.

That is, two adjacent tracks 14 may differ in terms of direction or amount of eccentricity. As a result, the track pitch between the two tracks 14 may be partially narrower than the rest in the circumferential direction.

In the part narrower in track pitch, it is more likely that the radial width of a data written area decreases to or below a given value due to the positional variation in the magnetic head 2 caused by NRRO, than in the rest of the tracks. In other words, it is more likely that it becomes difficult to read data from the part narrower in track pitch, than from the rest of the tracks.

Thus, according to the first embodiment, the magnetic disk device 100 sets the WOS depending on the track pitch, in order to reduce the possibility that difficulty in reading data from the part with a narrower track pitch occurs.

Figure 3:
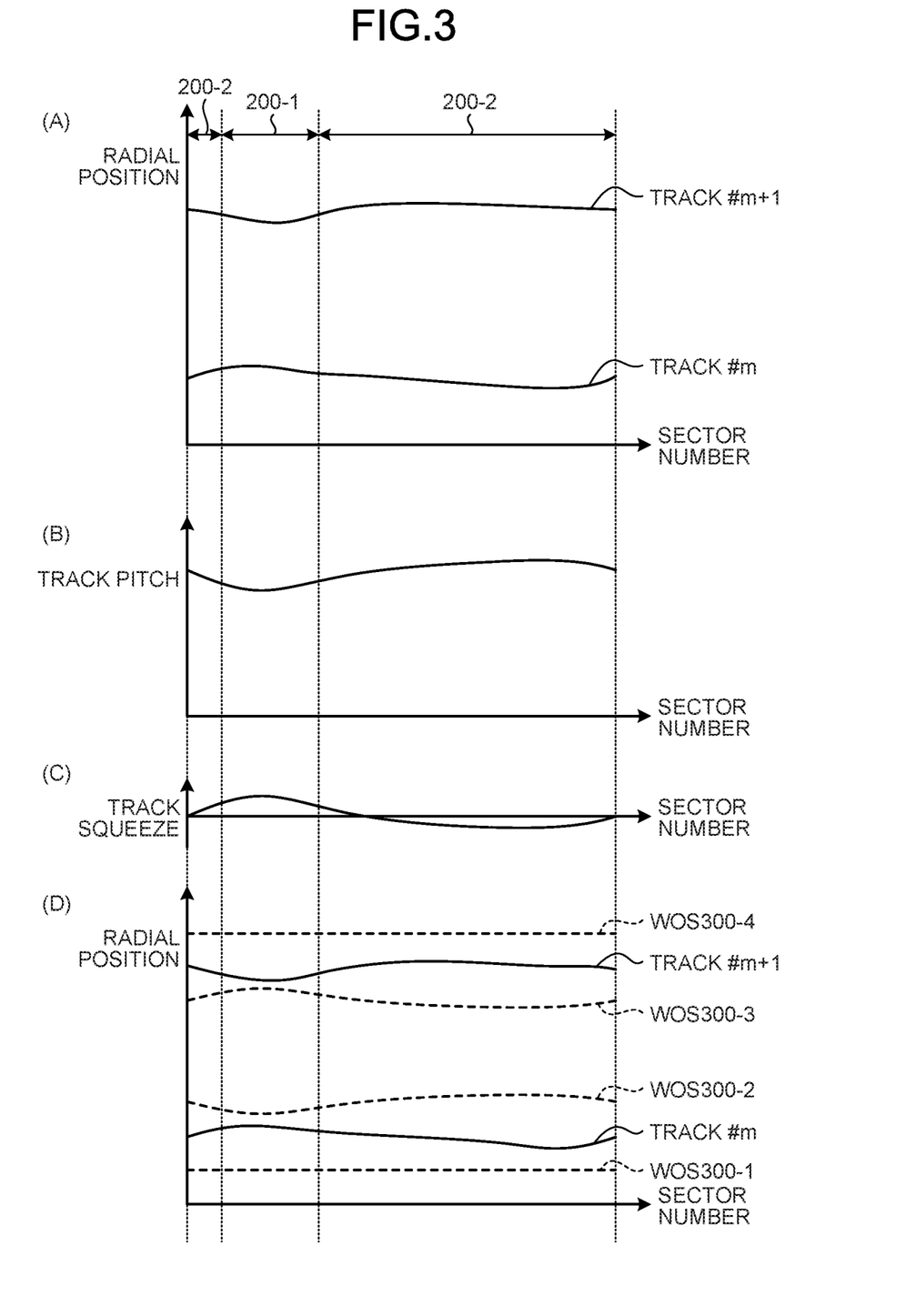
FIG. 3 is a view for explaining a method of setting write off-track slice (WOS) according to the first embodiment.

FIG. 3 shows graphs (A) to (D) for explaining a method of setting the WOS in the first embodiment.

In FIG. 3 the graph (A) illustrates radial positions or target positions of two adjacent tracks 14 and the graph (B) illustrates a track pitch between the two tracks 14. The inner side of the two tracks 14 is denoted by track #m, and the outer side of the two tracks 14 is denoted by track #m+1. In the graph (A) the vertical axis indicates a radial position, and in the graph (B) the vertical axis indicates a track pitch. In the graphs (A) and (B) the horizontal axes indicate a circumferential position by sector number. The horizontal axes of the graphs (A) to (D) all indicate sector number and the scales thereof are the same.

It is seen from the graphs (A) and (B) that the track pitch decreases in a part 200-1 from a part 200-2, for example. That is, it may be more difficult to read data from the part 200-1 than from the part 200-2 due to the NRRO.

In the graph (C) of FIG. 3 the vertical axis indicates a decrease in the track pitch. As illustrated in this graph, the decrease is larger in the part 200-1 than in the part 200-2. In this graph and in the following, the decrease in the track pitch represents the amount of decrease from a reference value of the track pitch. Decrease in the track pitch, smaller than the reference value, is denoted by a positive sign. The definition of the decrease and addition of the sign are not limited to this example.

The reference value can be set optionally. While the servo information contains no writing error, each track is set as a perfect circle with no eccentricity. Such a track is referred to as an ideal track. Assumed that the track #m and the track #m+1 be ideal tracks, the track #m and the track #m+1 are to be perfect circles with no eccentricity, thus, the track pitch between the track #m and the track #m+1 is to be constant in the circumferential direction. For example, the track pitch between the track #m and the track #m+1 assumed to ideal tracks can be set to the reference value. That is, the track pitch coincides with the reference value when the servo information is written without writing error.

In FIG. 3 the graph (D) illustrates an exemplary WOS. WOS 300-1 represents the inner side of two WOSs of the track #m. WOS 300-2 represents the outer side of the two WOSs of the track #m. WOS 300-3 represents the inner side of two WOSs of the track #m+1. WOS 300-4 represents the outer side of the two WOSs of the track #m+1.

In the part 200-1, the spacing between the WOS 300-2 and the track #m becomes narrower. In the part 200-1, the spacing between the WOS 300-3 and the track #m+1 also becomes narrower. That is, the WOS is set such that the writable range of the part 200-1 (specifically, the outer circumferential side of the writable range of the track #m and the inner circumferential side of the writable range of the track #m+1) becomes narrower than the writable range of the part 200-2 (specifically, the outer circumferential side of the writable range of the track #m and the inner circumferential side of the writable range of the track #m+1).

By such WOS setting, in the region with a decreased track pitch, e.g., the part 200-1, the magnetic head 2 is tightly restricted from moving in the orientation of further decreasing the track pitch. This can thus reduce the possibility that difficulty in reading data from the region concerned occurs.

The part 200-1 is an exemplary second region. The part 200-2 is an exemplary first region.

In the graph (D) of FIG. 3, the WOS 300-1 and the WOS 300-4 are set to fixed values by way of example. In practice, the WOS 300-1 is set depending on the track pitch between the track #m−1 and the track #m. The WOS 300-4 is set depending on the track pitch between the track #m+1 and a track #m+2.

The WOS can be set at a given granularity. For example, the WOS can be set in units of servo sectors. Alternatively, the WOS may be set in units of tracks larger than the servo sectors. Hereinafter, the WOS will be set in units of servo sectors unless otherwise specified.

The WOS serves as write control information 30 and is stored in a given location. The write control information 30 includes two or more regions of the magnetic disk 1 and WOSs for use in write operation to the regions in association with each other. The regions are exemplified by areas in units of servo sectors. The regions are not limited to this example. The regions may be the tracks 14.

The write control information 30 can be stored in any location.

Figure 4:
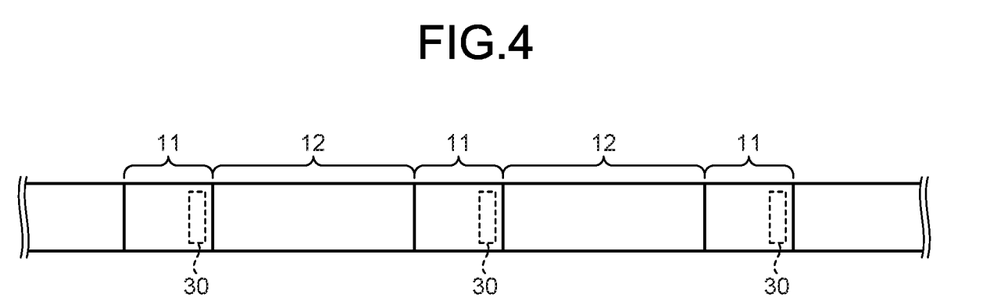
FIG. 4 is a view illustrating an exemplary storage of write control information according to the first embodiment.

As an example, the write control information 30 is stored in the servo areas 11 of the magnetic disk 1 as illustrated in FIG. 4. The write control information 30 is, for example, added to the post code.

For example, the servo area 11 of one track 14 contains the write control information 30, that is, WOS of each servo sector of the one track 14. At the time of positioning the magnetic head 2 on the one track 14, the write control information 30 is read from the servo area 11 and input to the controller 7 via the position detecting circuit 6. The controller 7 uses the write control information 30 (that is, WOS) to control a write operation to the one track 14.

Figure 5:
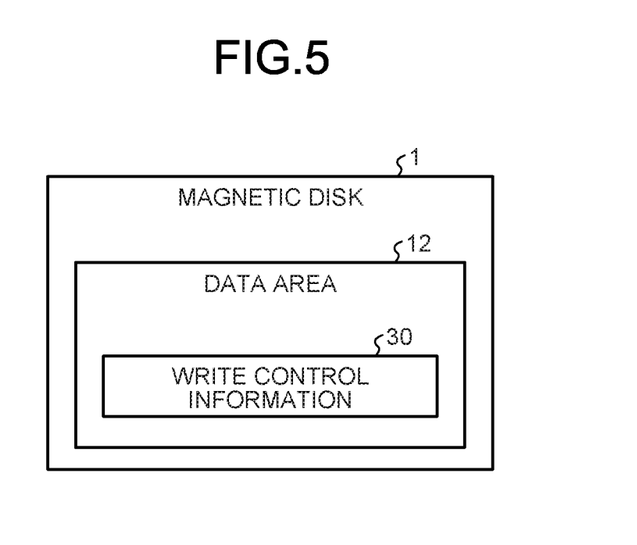
FIG. 5 is a diagram illustrating another example of the storage of the write control information according to the first embodiment.

As another example, the write control information 30 is stored in the data area 12 of the magnetic disk 1 as illustrated in FIG. 5.

The write control information 30 containing WOSs of all the tracks 14 may be stored in a system area. In such a case, the controller 7 controls loading of the write control information 30 from the system area to the RAM 22 at given timing, such as upon power-on of the magnetic disk device 100. The controller 7 uses the write control information 30 in the RAM 22 during the write operation.

Alternatively, the WOSs of the tracks 14 as the write control information 30 may be stored in a distributed manner in the data areas 12 of the corresponding tracks 14.

Figure 6:
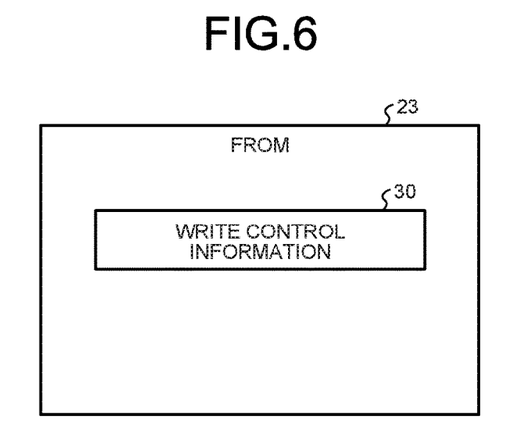
FIG. 6 is a diagram illustrating still another example of the storage of the write control information according to the first embodiment.

As still another example, the write control information 30 is stored in the FROM 23 as illustrated in FIG. 6. The controller 7 controls loading of the write control information 30 from the FROM 23 to the RAM 22 at given timing such as upon power-on of the magnetic disk device 100. The controller 7 uses the write control information 30 in the RAM 22 during the write operation.

Figure 7:
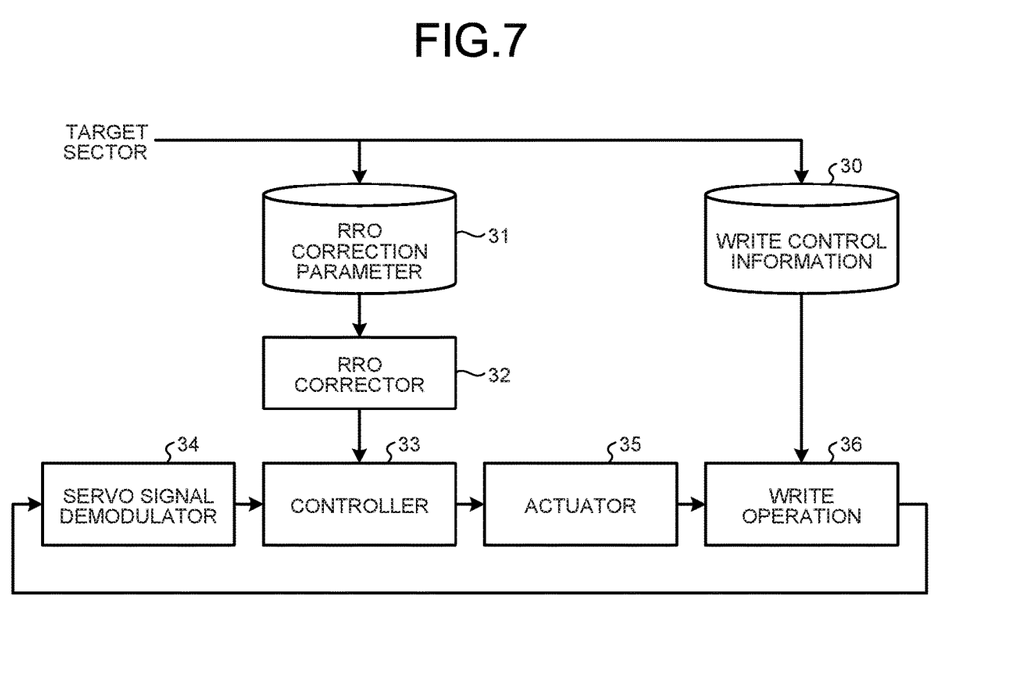
FIG. 7 is a block diagram illustrating a control system of the magnetic disk device according to the first embodiment.

FIG. 7 is a block diagram illustrating a control system of the magnetic disk device 100 of the first embodiment.

First, an RRO corrector 32 acquires an RRO correction parameter 31 for a write target sector or a target servo sector to calculate an amount of correction for the position of the magnetic head 2, and inputs it to the controller 33. The controller 33 calculates an input value to an actuator 35 to drive from the current position of the magnetic head 2 obtained by a servo signal demodulator 34 and the correction amount calculated by the RRO corrector 32.

The functions of the RRO corrector 32 and the controller 33 are implemented by the CPU 21, for example. The function of the servo signal demodulator 34 is implemented by the signal processing circuit 5 and the position detecting circuit 6 in cooperation. The actuator 35 corresponds to the VCM driver circuit 8. The RRO correction parameter 31 is stored in, for example, the FROM 23, and the RRO corrector 32 acquires the RRO correction parameter from the FROM 23. The location where the RRO correction parameter 31 is stored is not limited to the FROM 23. As with the write control information, the RRO correction parameter 31 may be stored in the servo area 11 or the data area 12 (for example, system area).

The actuator 35 drives the arm 3 in accordance with the input value to move the magnetic head 2 to a corrected position.

The CPU 21 serves to control the magnetic head 2 to perform a write operation 36. In the write operation 36, the CPU 21 acquires a WOS, i.e., the write control information 30 for a write-target servo sector. Then, the CPU 21 control the write operation 36 using the WOS. The servo information is read from the magnetic disk 1 during the write operation 36 and input to the servo signal demodulator 34. The servo signal demodulator 34 updates the current position of the magnetic head 2 to be input to the controller 33 on the basis of the servo information.

In this manner, the RRO is corrected at the time of positioning the magnetic head 2 in the first embodiment. Under the positioning control, the magnetic head 2 performs the write operation 36 on the basis of the write control information 30.

Next, an operation of the magnetic disk device 100 of the first embodiment will be described.

Figure 8:
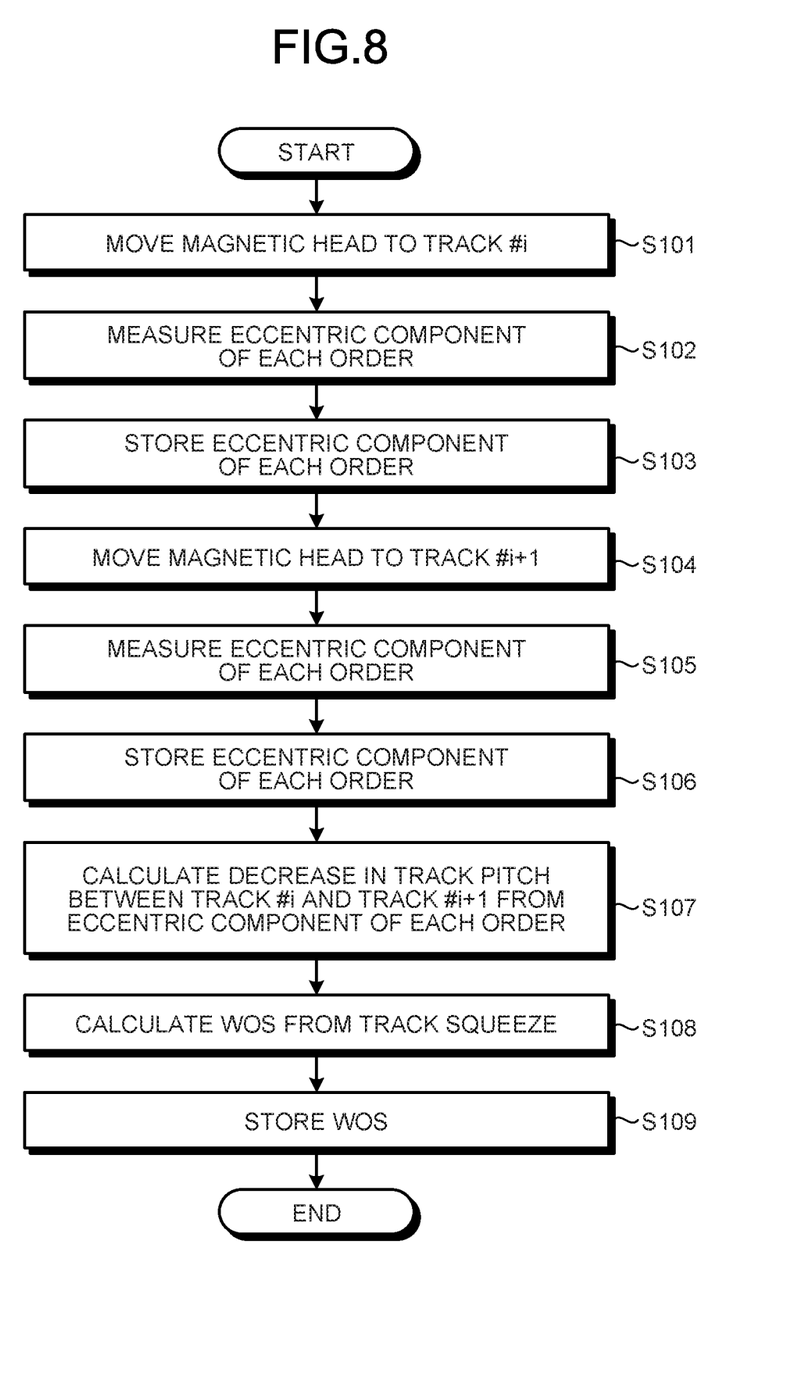
FIG. 8 is a flowchart illustrating an exemplary series of processes for generating WOS serving as write control information according to the first embodiment.

FIG. 8 is a flowchart illustrating an exemplary series of processes for generating the WOS serving as the write control information 30 in the first embodiment. The series of processes illustrated in FIG. 8 may be executed before the shipment of the magnetic disk device 100 or at optional timing after the shipment.

Herein, an example of calculating WOSs of a track #i and a track #i+1 from a track pitch between the track #i and the track #i+1 adjacent to the outer circumference of the track #i will be described. In practice, every two adjacent tracks are subjected to the series of processes illustrated in FIG. 8, to calculate WOSs for all the tracks 14.

First, the controller 7 controls an input value to the VCM 4 to move the magnetic head 2 to the track #i (S101). The controller 7 measures an eccentric component of each order while performing tracking control over the magnetic head 2 to be positioned on the track #i of the rotating magnetic disk 1 (S102). The eccentric component refers to, for example, a combination of a phase and an amplitude.

After S102, the controller 7 stores the measured eccentric component of each order in a given memory (S103). The eccentric component may be stored in any location. For example, the eccentric component can be stored in the FROM 23, the RAM 22, or the magnetic disk 1.

The controller 7 then controls an input value to the VCM 4 to move the magnetic head 2 to the track #i+1 (S104). The controller 7 subjects the track #i+1 to the same processes in S102 and S103. That is, the controller 7 measures an eccentric component of each order while performing tracking control over the magnetic head 2 to be positioned on the track #i+1 of the rotating magnetic disk 1 (105). Then, the controller 7 stores the measured eccentric component of each order in a given memory (S106).

The controller 7 calculates a decrease in the track pitch between the track #i and the track #i+1 from the eccentric component of each order stored in S103 and S106 (S107).

The following will describe an exemplary calculating method of the decrease in the track pitch between the track #i and the track #i+1.

Track squeeze z in the radial direction can be expressed by the following Formula (1):

$$z = \text{Tpb} - \text{abs}((x(i,t) - x(i+1,t))). \tag{1}$$

In the expression (1) Tpb represents a reference value of the track pitch between the track #i and the track #i+1, t represents a sector number, x(j, t) represents a radial position of a track #j, and abs represents an operator for calculating an absolute value.

The radial position x(j, t) can be expressed by a square root of a sum of squares of an RRO component and a NRRO component. To calculate the track squeeze caused by eccentricity, the NRRO component can be ignored. That is, x(j, t) can be expressed by the following Formula (2):

$$x(j,t) = \text{RRO}(j,t) \tag{2}$$

where RRO represents the RRO component.

Thus, the track squeeze, specifically, the track squeeze caused by eccentricity can be expressed by the following Formula (3):

$$Z = \text{Tpb} - (\text{RRO}(i,t) - \text{RRO}(i+1,t)). \tag{3}$$

The RRO can be expressed as the sum of eccentric components of the first order or higher. That is, the RRO can be expressed by the following Formula (4):

$$\text{RRO}(j,t) = Aj1 \times \sin(\theta t + \phi j1) + Aj2 \times \sin(\theta t + \phi j2) + Aj3 \times \sin(\theta t + \phi j3) + \ldots \tag{4}$$

where θt represents a phase at the sector number t, Ajk represents an amplitude of the k-th order eccentricity of the track #j, and ϕjk represents an offset of the k-th order eccentricity of the track #j, that is, a phase at the sector number zero.

The eccentric components of each order of the tracks #i and #i+1 are stored in S103 and S106. The CPU 21 can find the track squeeze z by applying the eccentric components of each order of the track #i and the track #i+1 and Formula (4) to Formula (3).

After S107, the controller 7 calculates a WOS of the outer circumference of the track #i and a WOS of the inner circumference of the track #i+1 from the calculated track squeeze (S108). Each WOS is set such that an allowable offset of the position of the magnetic head 2 from the track #i and the track #i+1 decreases as the track squeeze increases.

In the case of the tracks 14 assumed to be ideal tracks, for example, temporary WOSs are set at positions apart by a certain value from the outer circumference and the inner circumference of each track 14. The ideal tracks 14 are perfect circles with no eccentricity so that the temporary WOSs set on the inner circumference and the outer circumference of each of the tracks 14 are to be perfect circle with no eccentricity. The controller 7 can calculate an intended WOS by adding or subtracting the track squeeze z to or from the temporary WOS.

For example, WOS(i, outer) can be calculated by the following Formula (5):

$$WOS(i,\text{outer}) = WOSt(i,\text{outer}) - z \qquad (5)$$

where WOS(i, outer) represents the outer side of two intended WOSs of the track #i, and WOSt(i, outer) represents a temporary WOS of the outer circumference of the track #i.

Thereby, it is possible to decrease the writable range on the outer circumference of the track #i as the track squeeze z increases.

Further, WOS(i+1, inner) can be calculated by the following Formula (6):

$$WOS(i+1,\text{inner}) = WOSt(i+1,\text{inner}) + z \qquad (6)$$

where WOS(i+1, inner) represents the inner side of two intended WOSs of the track #i+1 and WOSt(i+1, inner) represents a temporary WOS of the inner circumference of the track #i+1.

Thereby, it is possible to decrease the writable range on the inner circumference of the track #i+1 as the track squeeze z increases.

The controller 7 stores the intended WOSs calculated as above (S109), completing the operation.

Figure 9:
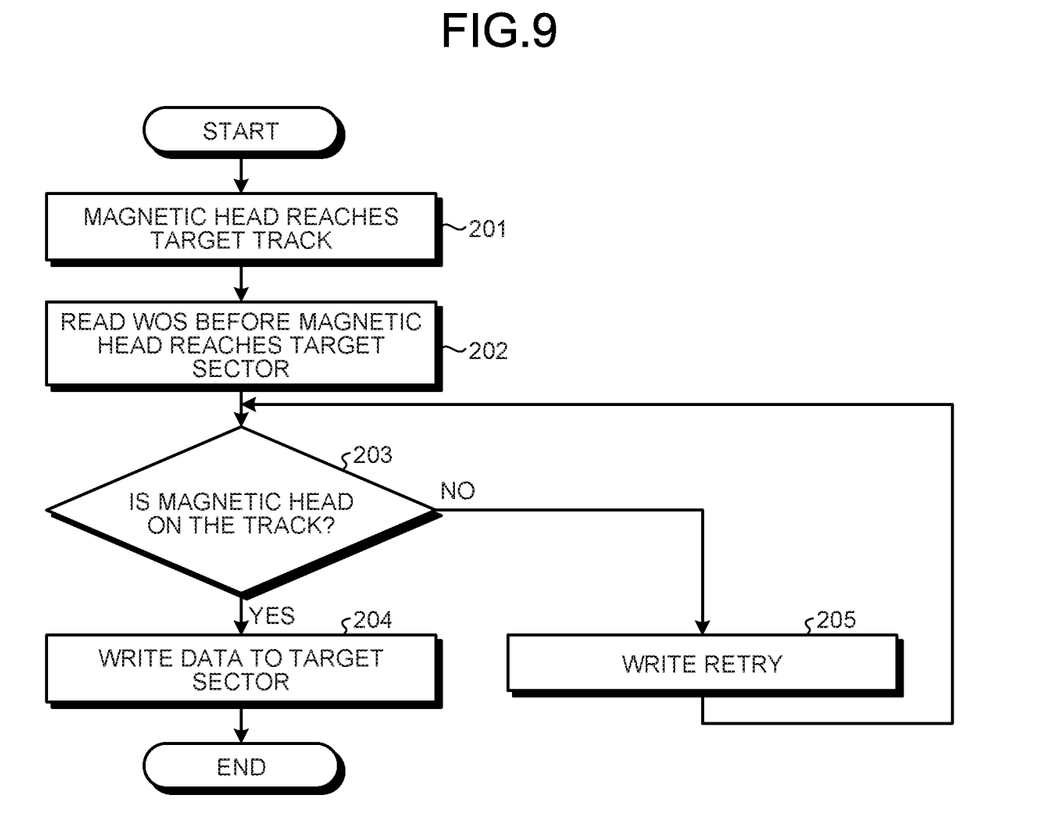
FIG. 9 is a flowchart illustrating an exemplary write operation according to the first embodiment.

FIG. 9 is a flowchart illustrating an exemplary write operation in the first embodiment.

The magnetic head 2 reaches a target track (S201) The controller 7 reads a WOS before the magnetic head 2 reaches a target sector, i.e., target servo sector (S202). Then, the controller 7 determines whether or not the magnetic head 2 is on the target track from the current position of the magnetic head 2 and the WOS (S203).

When the magnetic head 2 is on the target track (Yes in S203), the controller 7 causes the magnetic head 2 to write data to the target sector (S204), completing the write operation.

If the magnetic head 2 is not on the target track (No in S203), the controller 7 refrains from causing the magnetic head 2 to write data and performs a write retry. That is, the controller 7 postpones data write, and restarts the processing from S203 after the magnetic disk 1 is fully rotated.

The executable number of write retries may be limited. The processing at the time of the magnetic head 2 being not on the target track is not limited to the above example. After determining that the magnetic head 2 is not on the target track, the controller 7 may set a servo sector subsequent to the target sector as a new target sector to continue the write operation.

According to the first embodiment, as described above, the controller 7 differently controls a write operation to the first region and a write operation to the second region having a narrower track pitch than the first region. Specifically, in the write operation to the second region, the controller 7 determines whether or not the magnetic head 2 is on the target track, on the basis of a writable range narrower than a writable range set in the first region.

This makes it possible to lower the possibility that difficulty in reading data from the second region occurs.

The writable range may be set in a unit of track or in a unit of area (for example, a servo sector) smaller than the track. That is, the controller 7 may control the write operations in different manners in a unit of track or in a unit of area (for example, a servo sector) smaller than the track.

Further, the magnetic disk 1 or the non-volatile FROM 23 may store the write control information 30 containing the WOSs defining the writable ranges in the respective regions. The write control information 30 may be stored in the servo area 11.

Second Embodiment

The first embodiment has described the example that the WOS is set such that a narrower allowable write range is set to the second region having a narrower track pitch than to the first region. This can lower the possibility that difficulty in reading from the second region occurs.

Meanwhile, in a second embodiment, writing to the first region is permitted while writing to the second region is prohibited. This can eliminate the possibility that difficulty in reading from the second region occurs.

In the second embodiment, the write control information 30 contains the regions of the magnetic disk 1 and information indicating prohibition or non-prohibition of write operation to the regions in association with each other. The regions may be the tracks 14 or areas (for example, servo sectors) smaller than the tracks 14.

As in the first embodiment, the write control information 30 can be stored in any location. That is, the write control information 30 may be stored in the servo area 11 of the magnetic disk 1, in the data area 12 of the magnetic disk 1, or in the FROM 23. The write control information 30 can be stored in any location other than the locations above.

Figure 10:
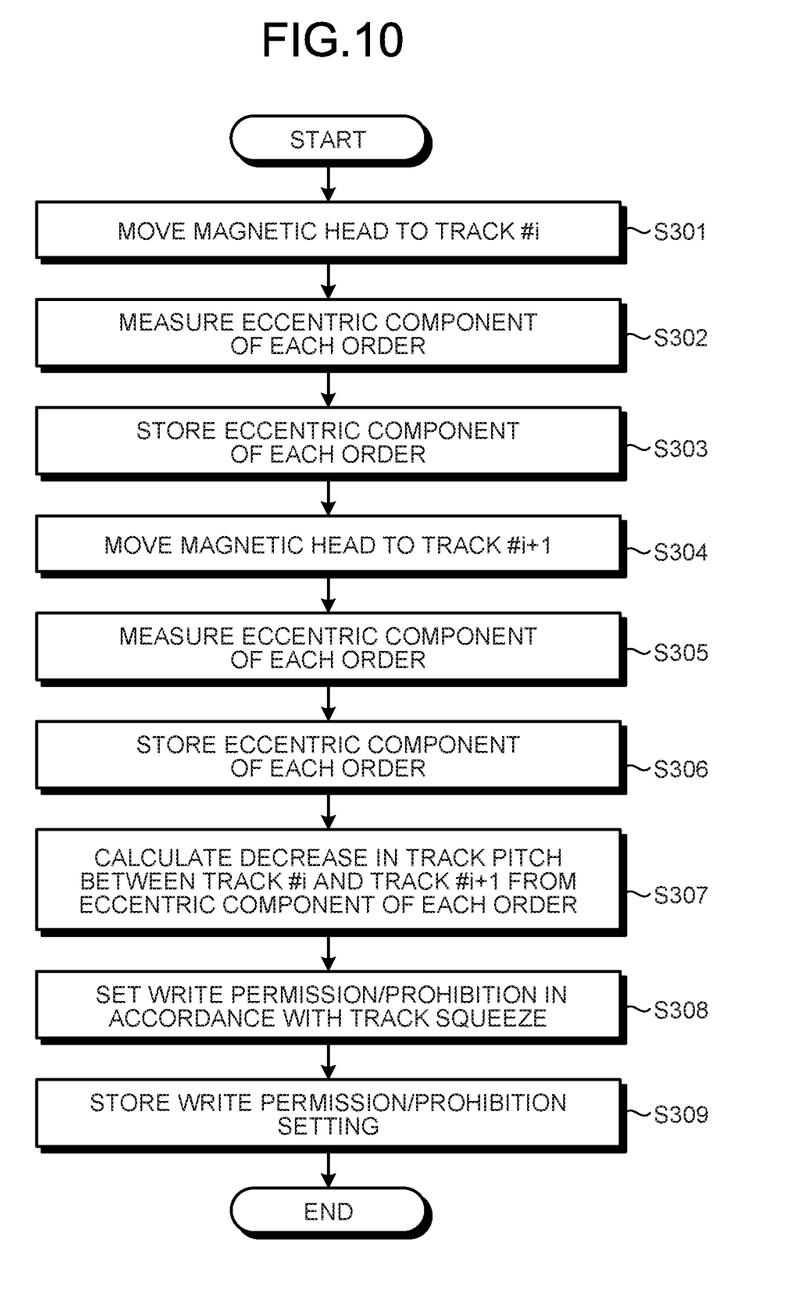
FIG. 10 is a flowchart illustrating an exemplary series of processes for generating write control information according a second embodiment.

FIG. 10 is a flowchart illustrating an exemplary series of processes for generating the write control information 30 in the second embodiment. The series of processes illustrated in FIG. 10 may be executed before the shipment of the magnetic disk device 100 or at optional timing after the shipment.

S301 to S307 correspond to S101 to S107 and are executed in order.

After S307, the controller 7 sets writing permission or prohibition in accordance with the decrease in the track pitch between the track #i and the track #i+1 (S308). For example, the controller 7 prohibits writing to a servo sector located in a part with a track squeeze exceeding a given threshold. The controller 7 permits writing to a servo sector located in a part with a track squeeze lower than the given threshold. If the track squeeze matches with the given value, the controller 7 may prohibit or permit writing.

Writing permission or prohibition may be set to both or one of the track #i and the track #i+1. For example, writing permission or prohibition may be set to the inner-side track 14 (herein, track #i) of the two adjacent tracks 14. Alternatively, writing permission or prohibition may be set to the outer-side track 14 (herein, track #i+1) of the two adjacent tracks 14.

The controller 7 then stores the write permission or prohibition setting serving as the write control information 30 (S309), completing the operation.

Every two adjacent tracks are subjected to the series of processes illustrated in FIG. 10, to calculate the write control information 30 for all the tracks 14.

Figure 11:
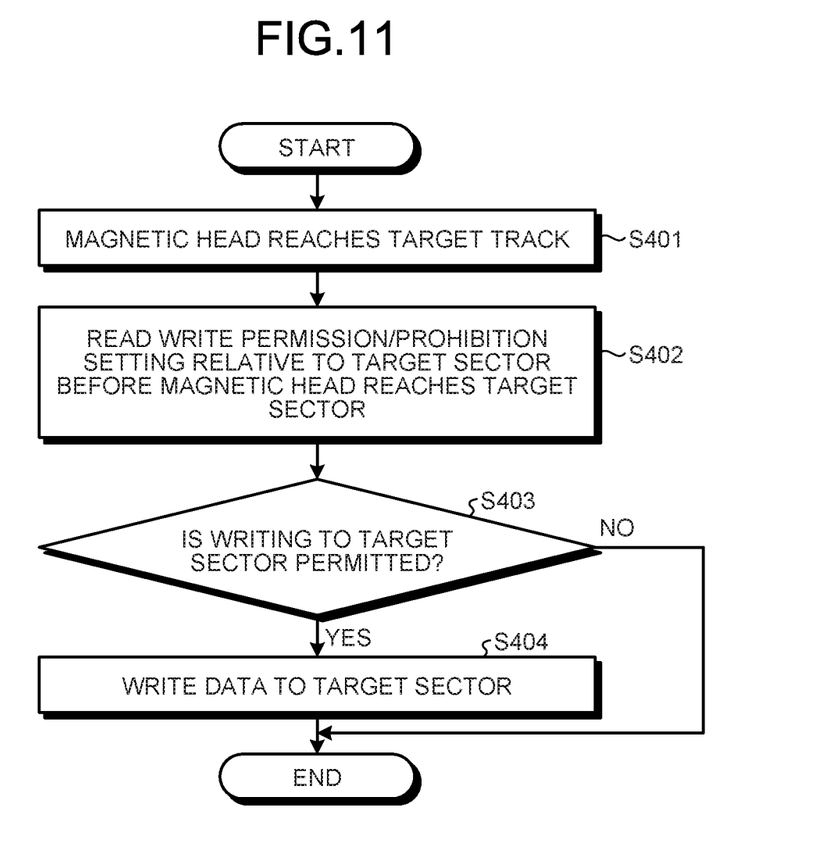
FIG. 11 is a flowchart illustrating an exemplary write operation according to the second embodiment.

FIG. 11 is a flowchart illustrating an exemplary write operation in the second embodiment.

The magnetic head 2 reaches a target track (S401) The controller 7 reads the write control information 30 for a target sector before the magnetic head 2 reaches the target sector (target servo sector) (S402). That is, the controller 7 obtains the write permission or prohibition setting of the target sector.

When writing to the target sector is permitted (Yes in S403), the controller 7 causes the magnetic head 2 to write data to the target sector (S404), completing the write operation.

When writing to the target sector is prohibited (No in S403), the controller 7 ends the operation without data write to the target sector. In such a case, for example, the controller 7 may set another servo sector as a new target sector, and control a write operation to the new target sector.

According to the second embodiment, thus, the controller 7 refrains from prohibiting writing to the first region, and prohibits writing to the second region having a narrower track pitch than the first region.

As a result, it is possible to lower the possibility that difficulty in reading from the second region occurs.

According to the first embodiment and the second embodiment, as described above, the controller 7 controls, in different manners, a write operation to the first region and a write operation to the second region having a narrower track pitch than the first region.

Thereby, it is possible to lower the possibility that difficulty in reading data from the second region occurs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk having a plurality of tracks;
a magnetic head that performs reading and writing from and to the magnetic disk; and
a controller that controls write operations to a first region and a second region of the magnetic disk in different manners, the second region being narrower in track pitch than the first region, wherein
the controller
calculates a decrease in the track pitch and generates, from the decrease, write control information for each of the first region and the second region, and
controls the write operations according to the write control information.

2. The magnetic disk device according to claim 1, wherein the controller determines whether or not the magnetic head is located on a write-target track among the plurality of tracks, through a comparison between a position of the magnetic head and a writable range, and the second region includes a narrower writable range than the first region.

3. The magnetic disk device according to claim 1, wherein the controller refrains from prohibiting a write operation to the first region, and prohibits a write operation to the second region.

4. The magnetic disk device according to claim 1, wherein the controller controls the write operations to the first region and the second region in different manners in a unit of track.

5. The magnetic disk device according to claim 1, wherein the controller controls the write operation to the first region in a unit of area smaller than one track.

6. The magnetic disk device according to claim 1, wherein the magnetic disk stores the write control information.

7. The magnetic disk device according to claim 6, wherein the magnetic disk includes a servo area, and
the servo area stores the write control information.

8. The magnetic disk device according to claim 1, further comprising
a non-volatile memory different from the magnetic disk, wherein
the non-volatile memory stores the write control information.

9. The magnetic disk device according to claim 1, wherein the controller measures eccentric components of two adjacent tracks among the plurality of tracks, and calculates the decrease in the track pitch from the eccentric components of the two adjacent tracks.

10. A method of controlling a magnetic disk device, the magnetic disk device comprising a magnetic disk having a plurality of tracks; a magnetic head that performs reading and writing from and to the magnetic disk, the method comprising:
controlling write operations to a first region and a second region of the magnetic disk in different manners, the second region being narrower in track pitch than the first region, wherein
the method further comprising
calculating a decrease in the track pitch;
generating, from the decrease, write control information for each of the first region and the second region; and
controlling the write operations according to the write control information.

11. The method according to claim 10, further comprising determining whether or not the magnetic head is located on a write-target track among the plurality of tracks, through a comparison between a position of the magnetic head and a writable range, wherein
the second region includes a narrower writable range than the first region.

12. The method according to claim 10, further comprising refraining from prohibiting a write operation to the first region, and prohibiting a write operation to the second region.

13. The method according to claim 10, wherein
the controlling comprises controlling the write operations to the first region and the second region in different manners in a unit of track.

14. The method according to claim 10, wherein
the controlling comprises controlling the write operation to the first region in a unit of area smaller than one track.

15. The method according to claim 10, wherein
the magnetic disk stores the write control information.

16. The method according to claim 10, wherein
the magnetic disk includes a servo area, and
the servo area stores the write control information.

17. The method according to claim 10, wherein
the magnetic disk device further comprises a non-volatile memory different from the magnetic disk, and
the non-volatile memory stores the write control information.
18. The method according to claim 1, further comprising:
measuring eccentric components of two adjacent tracks among the plurality of tracks; and
calculating the decrease in the track pitch from the eccentric components of the two adjacent tracks.

* * * * *